April 7, 1931.   H. EPSTEIN   1,799,963
VEGETABLE GRATER
Filed April 4, 1930   2 Sheets-Sheet 1
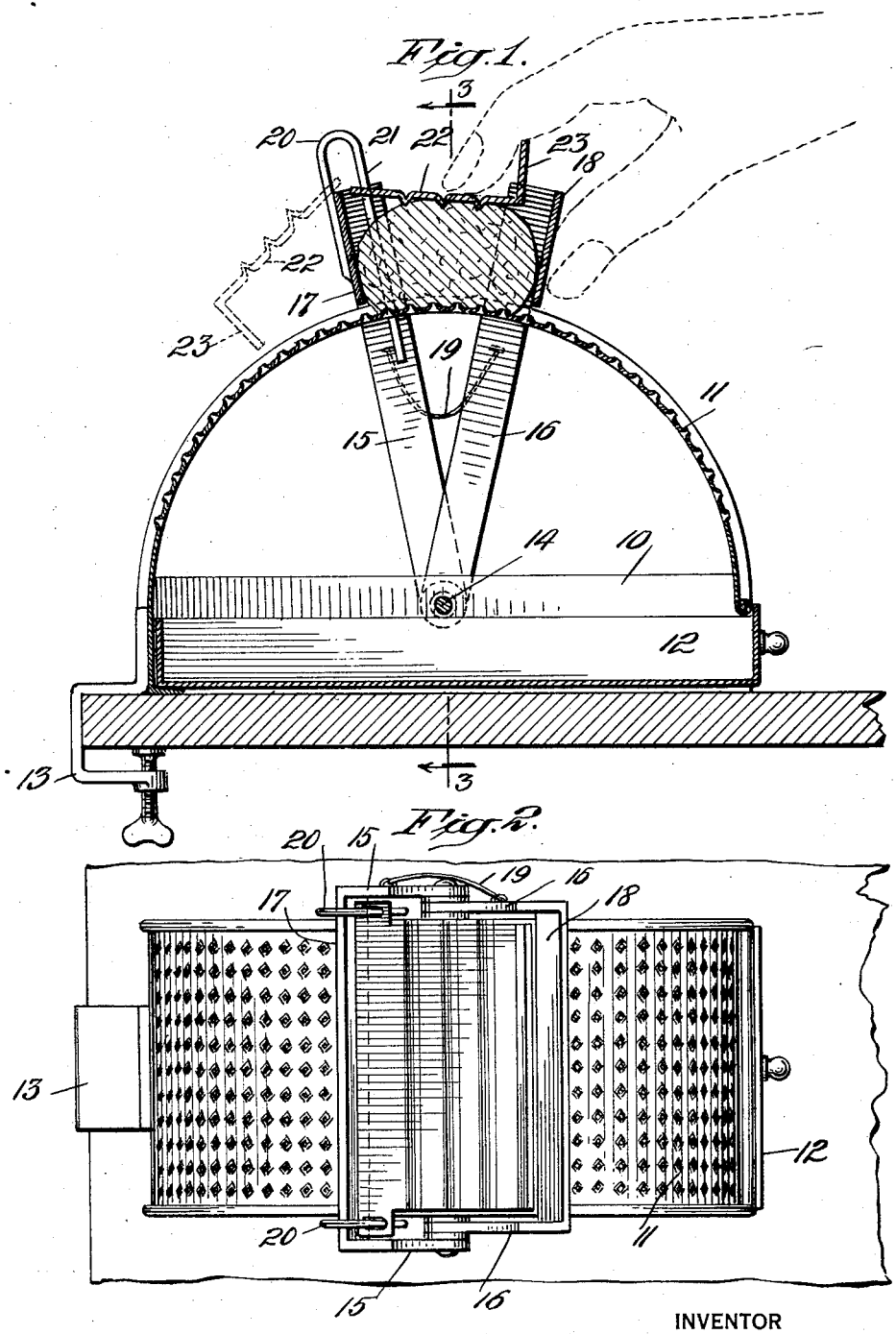
INVENTOR
HARRIS EPSTEIN
BY
Geo. S. Wheelock
ATTORNEY April 7, 1931.  H. EPSTEIN  1,799,963
VEGETABLE GRATER
Filed April 4, 1930   2 Sheets-Sheet 2
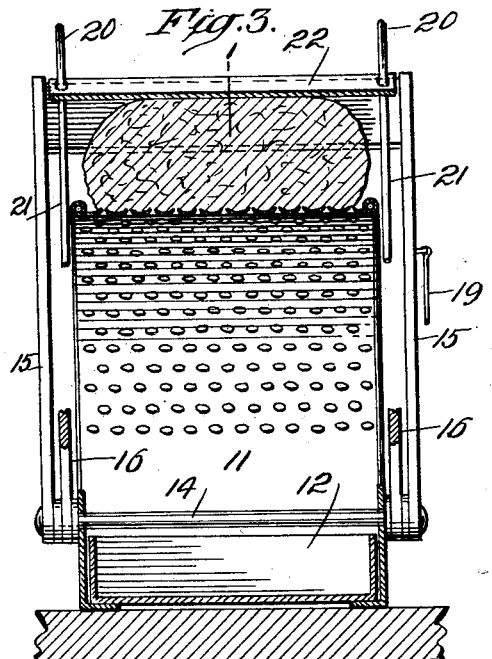
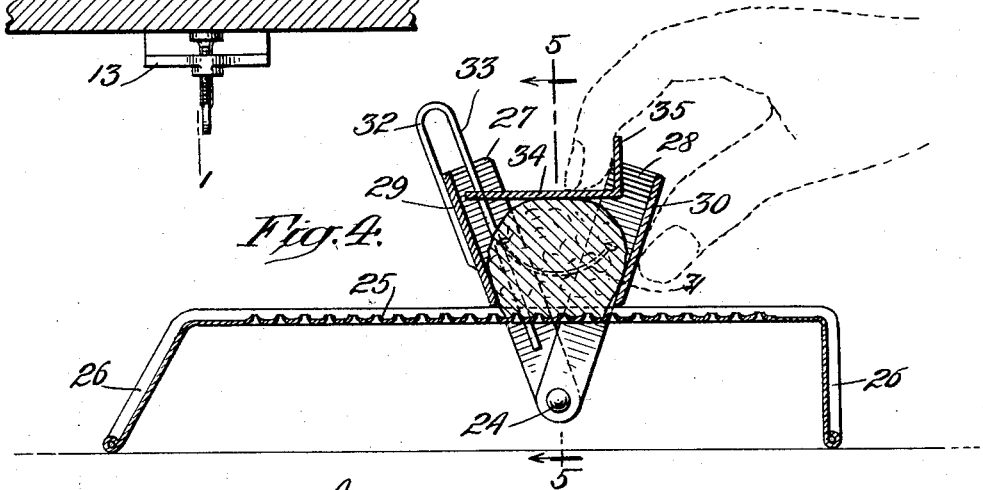
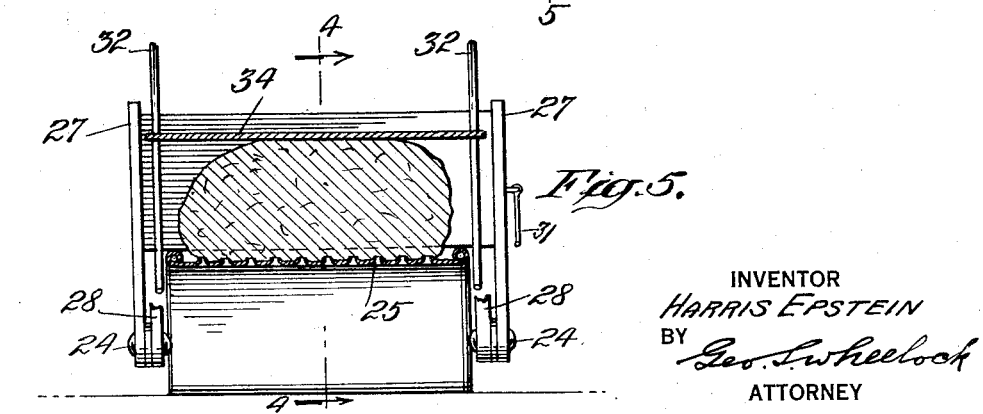
INVENTOR
HARRIS EPSTEIN
BY
ATTORNEY Patented Apr. 7, 1931

1,799,963

UNITED STATES PATENT OFFICE

HARRIS EPSTEIN, OF ROCKAWAY BEACH, NEW YORK

VEGETABLE GRATER

Application filed April 4, 1930. Serial No. 441,494.

This invention relates to vegetable graters of the type wherein suitable reciprocating means hold the vegetable or the like for the purpose of pressing the same upon the grater proper or grater plate so that the gratings and juices may be collected for use.

One of the objects of the present invention is to provide a vegetable grater wherein there is a pair of opposed jaws suitably connected together for a relative movement, which jaws may be held in operative relation by one hand of the operator, and wherein suitable means are provided for preventing a too wide separation of the jaws; that is to say whereby the jaws are held to an angular position relatively to each other, so that it is merely necessary to press the jaws together, much more conveniently than if the jaws were permitted to move an indefinite distance apart.

Another object of the invention is to provide a pressure member which is positionable in between the reciprocable jaws so as to press the vegetable downwardly towards the grater plate, or said pressure member may be moved away from the jaws so as to receive the vegetable between them; such pressure member being preferably so disposed and constructed that it is only necessary for the operator to use one hand to hold one of the jaws and by the fingers of the same hand to take hold of the pressure member, thereby not only holding the vegetable down against the grater plate, but enabling the said hand of the operator to exert a pull on the other jaw and hold it in operative relation to the jaw which is engaged by the hand, thereby to assure that the two jaws are caused to clutch or grasp the vegetable which is being grated.

Still another object of the invention is to provide a vegetable grater having the previously specified objects, and wherein the jaws are pivoted together and to a suitable support, whereby the jaws are adapted to be reciprocated in the arc of a circle in operative relation to an arcuate grater plate. Other objects are to provide a vegetable grater of the kind specified which is of simple construction, durable and practicable and economical to manufacture, and which is preferably provided with a drawer to collect the gratings and the juices which pass through the perforations of the grater plate.

These being among the objects of the present invention, the same consists of certain features of construction and combinations of parts to be hereinafter described and then claimed with reference to the accompanying drawings illustrating a preferred and modified construction and wherein—

Figure 1 is a section on line 1—1 of Fig. 3 showing the preferred construction of grater in using position for grating a vegetable;

Fig. 2 is a plan of Fig. 1;

Fig. 3 is a section on line 3—3 of Fig. 1;

Fig. 4 is a cross-section of a modified form of the invention, on line 4—4, Fig. 5; and Fig. 5 is a section on line 5—5 of Fig. 4.

Referring to Figs. 1, 2 and 3, a suitable base or support is provided including two plates which connect together the opposite ends of an arcuate grater plate 11. Slidably arranged in the base or support 10 there is a drawer 12 for collecting the gratings and juices, whether of vegetables, fruits or the like, and preferably a clamp 13 is provided whereby the improved grater may be rigidly secured to a table.

A pivot pin 14 extends through the side plates of the base or support at approximately the mid-length thereof, and approximately at the center from which the curve of the arc of the grater plate 11 is generated. A pair of levers 15 is mounted on the pivot pin 14 and another pair of levers 16 is also mounted on the said pivot whereby the said levers are pivotally connected together at their lower ends and whereby they are pivotally mounted on the base or support 10. Two of the levers 15, 16 are mounted at one end of the pivot pin 14 and the other two of the levers of said pairs are mounted at the other end of the pivot pin, whereby there are arranged two swinging levers at opposite edges of the grater plate 11. Preferably the outer swinging ends of the levers 15, 16 extend beyond the grater plate 11 for a distance substantially equal to the transverse width of the plates 17, 18 forming a pair of opposing jaws beyond the grater plate and adapted to be swung in an arc concentric with the grater plate. The pivot 14 enables the jaws to be caused to oppose each other so as to grasp the vegetable as shown in order to hold it in position during the reciprocating movements imparted to the jaws, and so that said jaws may be opened up in order to receive the vegetable before it is grasped by the jaws.

Preferably a cord, chain or similar flexible connection 19 connects the two pairs of levers 15, 16, so as to permit the jaws to be opened out to receive a vegetable of maximum size, but which cord prevents the jaws from opening up too far or so far that they will depart from an angular relation to each other. When a vegetable is grasped by the jaws, this cord 19 will be slack.

Rigidly secured to the jaws 17 is a pair of U-shaped guide wires 20 arranged in parallel relation and the bends thereof being presented upwardly or outwardly away from the grater plate. One leg of each of the guide wires is secured to said jaws 17, while the other leg 21 of each of said wires extends downwardly, preferably for such distance as to pass slightly below the grater plate. These guide wires should be sufficiently stiff to withstand the necessary pull which is to be exerted on their inner legs, which may be free at their inner extremities for the sake of simplicity and cheapness of construction. Therefore, such guide wires extend transversely of the jaw 17 and are disconnected from the other jaw 18, the legs 21 being slightly spaced away from jaw 17. The purpose of the said guides is to provide for the mounting of a pressure member 22 movably thereon, said pressure member being here shown in the form of a plate which is roughened or ribbed at its under surface and which is provided with holes to receive the guide wires 20. It will be seen that the said pressure member 22 may be moved into the position shown in full lines in Fig. 1 or backwardly into the position shown in broken lines, so that it is away from the jaws and not between them.

The pressure member or plate 22 is provided with a lip or projection 23 which extends outwardly when the pressure member is in downwardly pressing position, and the said lip provides means for enabling that hand of the operator which takes hold of the jaw 18, to make use of the fingers to engage the lip 23 as indicated in broken lines. It will hence be seen that one hand of the operator may be used to cause the reciprocation of the pair of jaws 17, 18, while at the same time the fingers of the hand which is employed may press downwardly upon the pressure member 22 so as to force the vegetable onto the grater plate 11. This leaves the other hand of the operator free for any other use desired, as, for example, placing a vegetable in between the jaws. The gratings and juices will be collected in the drawer 12 for removal and use.

In Figs. 4 and 5 a modification is illustrated which is of simpler construction than previously described, and this modification enables a straight to and fro movement of the hand which is used in doing the grating. A grater plate 25 is provided which is shown as straight, and it is supported on end supports 26, so as to elevate the grater plate to enable a dish to be placed under it to catch the gratings and juices.

In said modification there are two pairs of levers 27, 28 which are pivotally connected together by a pivot pin 24. The outer ends of these levers are provided with jaws 29, 30 which are adapted to oppose each other for the purpose of grasping a vegetable. To hold the jaws in angular relation so that they will not flop about on the pivot pin, a connecting cord 31 may be used which is attached at opposite ends to the levers 27, 28.

A pair of U-shaped guide wires 32 is employed similar to those previously described, one of the legs of each being fixed to the jaw 29 and the other legs extending inwardly across the inner face of the said jaw, so that a pressure member 34 provided with a lip or projection 35 may be movably mounted on the jaw 29. It will be seen that in using this form of grater, one hand of the operator need only be employed, the using position of the same being that in which the pivoted ends of the levers extend below or straddle the grater plate 25, the fingers of that hand which engages the jaw 30 being used to pull the two jaws together and at the same time to press the pressure member 34 down upon the vegetable. In this form of the invention a straight reciprocating movement acts to cause the grating of the vegetable. It will be seen that the grater plate and its supports constitute one unit and that the vegetable grasping and pressing members constitute a separate unit, so that the parts may be separated for readily cleaning them.

It is obvious that the invention is susceptible to more or less modification as parts may be omitted, added and substituted without departing from the scope of the appended claims.

What I claim as new is:

1. In a vegetable grater, the combination of a pair of opposed pivoted jaws, a pressure member positionable between the jaws, a guide fixed to one jaw, means for connecting the pressure member with the guide, for a movement thereon, and means associated with the other jaw and the pressure member for enabling one hand of an operator to cause the jaws to firmly grasp the vegetable and to hold the pressure member downward.

2. In a vegetable grater, the combination of a pair of opposed pivoted jaws, a pressure member positionable between the jaws, a guide fixed to one jaw, means for connecting the pressure member with the guide, for a movement thereon, and means associated with the other jaw and the pressure member for enabling one hand of an operator to cause the jaws to firmly grasp the vegetable and to hold the pressure member downward, and an elevated grater plate, the jaws being constructed to straddle the grater plate for permitting a to and fro motion thereof.

3. In a vegetable grater, the combination of a pair of opposed pivoted jaws, a pressure member positionable between the jaws, a guide fixed to one jaw, means for connecting the pressure member with the guide, for a movement thereon, the pressure member having an outward lip adapted to be engaged by the hand which takes hold of the other jaw, whereby to hold the vegetable in the grasp of the two jaws and the pressure member downward.

4. In a vegetable grater, the combination of two relatively movable jaws, a pressure member movably mounted on one jaw for a movement away from the jaws and for a movement inwardly between the jaws, and means associated with the other jaw and the pressure member for enabling one hand of an operator to cause the jaws to firmly grasp the vegetable and to hold the pressure member downward.

5. In a vegetable grater, the combination of two relatively movable jaws, U-shaped guide wires with one leg of each secured to one jaw, and the other leg of each extending downwardly between the jaws, a pressure member guided on the U-shaped wires for a movement away from the jaws and for a movement between the jaws, and means associated with the other jaw and the pressure member for enabling one hand of an operator to cause the jaws to firmly grasp the vegetable and to hold the pressure member downward.

6. In a vegetable grater, the combination of an arcuate grater plate, a pair of jaws, means for pivotally connecting their inner ends, and means for mounting the pivot at the center from which the arc is generated, the grasping portions of the jaws extending beyond the grater plate, and a pressure member mounted movably on one of the jaws outside the grater plate.

7. In a vegetable grater, the combination of an arcuate grater plate, a pair of jaws, means for mounting the jaws for a movement concentric with the plate, a pressure member mounted movably on one jaw for a movement to position it between the jaws or away from them, and means permitting the other jaw and the pressure member to be taken hold of by one hand in operating the grater.

8. In a vegetable grater, the combination of an arcuate grater plate, a pair of jaws, means for mounting the jaws for a movement concentric with the plate, a pressure member mounted movably on one jaw for a movement to position it between the jaws or away from them, and an outward projection on the pressure member for engagement by the hand of the operator in taking hold of the other jaw.

HARRIS EPSTEIN.